(12) United States Patent
Ishigami et al.

(10) Patent No.: US 7,388,332 B2
(45) Date of Patent: Jun. 17, 2008

(54) METAL VAPOR DISCHARGE LAMP, FLOODLIGHT PROJECTOR AND METAL VAPOR DISCHARGE LAMP LIGHTING DEVICE

(75) Inventors: Toshihiko Ishigami, Kawasaki (JP); Kozo Uemura, Imabari (JP); Mikio Matsuda, Tokyo (JP); Toshio Hiruta, Hiratsuka (JP); Hiroyoshi Takanishi, Yokohama (JP); Hideo Inoue, Yokosuka (JP)

(73) Assignees: Harison Toshiba Lighting Corp., Ehime-Ken (JP); Toshiba Lighting & Technology Corporation, Tokyo (JP)

( * ) Notice: Subject to any disclaimer, the term of this patent is extended or adjusted under 35 U.S.C. 154(b) by 277 days.

(21) Appl. No.: 10/680,896

(22) Filed: Oct. 8, 2003

(65) Prior Publication Data

US 2004/0070322 A1 Apr. 15, 2004

(30) Foreign Application Priority Data

Oct. 8, 2002 (JP) .............................. 2002-294617

(51) Int. Cl.
 *H01J 17/20* (2006.01)
 *H01J 61/18* (2006.01)
 *H01J 61/12* (2006.01)
 *H01J 61/40* (2006.01)
 *H01J 61/16* (2006.01)

(52) U.S. Cl. ..................... 313/638; 313/112; 313/637; 313/643; 313/567

(58) Field of Classification Search ................. 313/638
See application file for complete search history.

(56) References Cited

U.S. PATENT DOCUMENTS

| | | | | |
|---|---|---|---|---|
| 4,837,478 A | * | 6/1989 | Anzai et al. | 313/112 |
| 4,870,316 A | * | 9/1989 | Otani | 313/25 |
| 6,353,289 B1 | * | 3/2002 | Ishigami et al. | 313/637 |
| 6,528,946 B2 | * | 3/2003 | Ishigami et al. | 313/638 |
| 6,873,109 B2 | * | 3/2005 | Ishigami et al. | 313/638 |
| 2001/0056294 A1 | | 12/2001 | Hiramoto et al. | 607/88 |

FOREIGN PATENT DOCUMENTS

| | | |
|---|---|---|
| DE | 133614 | 1/1979 |
| EP | 0479634 A1 | 4/1992 |
| EP | 1156512 A1 | 11/2001 |
| JP | 59-87748 | 5/1984 |

(Continued)

OTHER PUBLICATIONS

European Search Report Oct. 16, 2006.

*Primary Examiner*—Sikha Roy
*Assistant Examiner*—Natalie K Walford
(74) *Attorney, Agent, or Firm*—John P. White; Cooper & Dunham LLP

(57) ABSTRACT

A metal vapor discharge lamp whose near-infrared radiation is stronger than a conventional high-pressure discharge lamp, a projector utilizing this discharge lamp, and a metal vapor discharge lamp lighting device are disclosed. The metal vapor discharge lamp comprises a refractory light-transmitting hermetic vessel, a pair of electrode fixed to the hermetic vessel, and a discharge medium sealed in the hermetic vessel and containing a halide and a rare gas. Most of the light irradiated when the discharge lamp is in the ON state has near-infrared wavelengths (750–1100 nm).

17 Claims, 8 Drawing Sheets

FOREIGN PATENT DOCUMENTS

| | | |
|---|---|---|
| JP | 59-167948 | 9/1984 |
| JP | 59-167949 | 9/1984 |
| JP | 63281343 | 11/1988 |
| JP | 63281344 | 11/1988 |
| JP | 63281345 | 11/1988 |
| JP | 4070736 | 11/1992 |
| JP | 11238488 | 1/1999 |
| JP | 2001-60403 | 3/2001 |
| JP | 2003257367 A * | 9/2003 |

* cited by examiner

METAL VAPOR DISCHARGE LAMP, FLOODLIGHT PROJECTOR AND METAL VAPOR DISCHARGE LAMP LIGHTING DEVICE

CROSS-REFERENCE TO RELATED APPLICATIONS

This application is based upon and claims the benefit of priority from the prior Japanese Patent Application No. 2002-294617, filed Oct. 8, 2002, the entire contents of which are incorporated herein by reference.

BACKGROUND OF THE INVENTION

1. Field of the Invention

The present invention relates to a metal vapor discharge lamp for mainly performing near-infrared radiation, a projector equipped with the lamp, and a lighting device for metal vapor discharge lamps.

2. Description of the Related Art

For security during the night, recording of comings and goings of visitors and/or monitoring/detection of intruders is now being performed.

Such monitoring or detection is realized by photographing subjects or objects using, for example, a CCD camera. To photograph them, near-infrared radiation, which cannot be sensed by human beings, is widely utilized, since if visible light is used, the existence of a camera can be known, and the light may be dazzling and make them feel uncomfortable.

If an electric bulb is used as the light source, much near-infrared light is irradiated but the efficiency of visible light is lower than discharge lamps. Further, Jpn. Pat. Appln. KOKOKU Publication No. 4-70736, for example, discloses a near-infrared illuminator and photographing device for security that use a low-pressure rare gas discharge lamp for emitting a large amount of near-infrared light, the kind of rare gas in the lamp and its sealed pressure being suitably set.

The low-pressure rare-gas discharge lamp of this publication employs a relatively long glass bulb. Therefore, when this lamp is used as a near-infrared illuminator or in a near-infrared photographing device, if it is fixed in a certain position indoors or outdoors, no problems will occur. However, if the lamp is used in a mobile unit, such as a vehicle, it disadvantageously requires a large space. Further, if the lamp uses coiled thin filaments as electrodes, the filaments may be easily broken since they do not show a high resistance against impact or vibration. This means that stable light emission cannot be expected for a long time.

The inventors of the present application have recently paid attention to a metal vapor discharge lamp used as a headlamp for, for example, vehicles. This lamp emits a large amount of near-infrared light and can be made as small as an electric bulb.

More specifically, halogen lamps are generally used as headlamps for vehicles in order to enhance the forward visibility for safety during the night or in tunnels. However, high-pressure metal vapor discharge lamps, such as metal halide lamps of a short arc type, have recently been employed, which emit light of a higher intensity and larger quantity than halogen lamps and have electrodes of a high resistance against impact or vibration.

Traffic accidents during the night between vehicles and pedestrians are not decreased, although those between vehicles are decreasing. Therefore, there is a demand for a means that enables drivers to quickly see pedestrians and avoid accidents. Metal vapor discharge lamps can illuminate a larger area than conventional halogen lamps since the former lamps emit higher intensity light, thereby enabling drivers to have a higher visibility and show a quicker response.

However, illuminating a larger area brightly means that pedestrians may be dazzled and feel uncomfortable even at a distance.

In light of this, there is a need for a high-pressure metal vapor discharge lamp used as, for example, the headlamp of a vehicle or a monitor lamp in a banking facility, which can irradiate pedestrians or customers with near-infrared light and visible light of moderate intensity.

BRIEF SUMMARY OF THE INVENTION

The present invention has been developed in light of the above circumstances, and aims to provide a metal vapor discharge lamp capable of emitting a larger amount of near-infrared light than conventional high-pressure discharge lamps, a projector equipped with the lamp, and a metal vapor discharge lamp lighting device.

A metal vapor discharge lamp according to a first embodiment comprises:

a refractory and light-transmitting hermetic vessel;

a pair of electrode fixed to the hermetic vessel; and a discharge medium sealed in the hermetic vessel, the discharge medium containing a halide, a rare gas and substantially disusing mercury, wherein most of light irradiated when the metal vapor discharge lamp is in an ON state has near-infrared wavelengths (750–1100 nm).

This lamp is a high-pressure discharge lamp in which the ratio of the total near-infrared (750–1100 nm) radiation output to the total visible radiation output is 50% or more. Therefore, this lamp is inferior in visibility, but its main radiation is near-infrared radiation. This lamp includes a lamp that does not provide visible radiation.

The first embodiment is characterized in that no mercury is sealed. If mercury is sealed together with a material (CsI, RbI, KI) that mainly radiates near-infrared light, mercury generates a high vapor pressure, and much radiation of mercury is observed in the visible and ultraviolet regions. This is opposed to the case where if mercury is sealed together with $ScI_3$, NaI, etc., Sc and Na radiate much visible light, which significantly suppresses visible and ultraviolet radiation of mercury. Ultraviolet radiation of mercury damages a headlamp (in particular, a headlamp made of plastic), therefore an upper limit is set on the amount of ultraviolet radiation. To suppress the leakage of ultraviolet radiation to the outside of the lamp, a technique for making the outer tube of the lamp of, for example, ultraviolet-absorbing quartz has recently been employed. Even this technique cannot sufficiently suppress the leakage if a large amount of ultraviolet light of mercury is irradiated by the lamp. The lamp voltage is relatively low if no mercury is sealed. However, it has recently been found that if no mercury is sealed, plasma mainly comprising the above-mentioned sealed material (CsI, RbI, KI) that mainly radiates near-infrared light generates an electrode fall voltage significantly lower than that (approx. 15 V) obtained when mercury is sealed. This meant that even if the lamp voltage is low, the ratio of a voltage loss in the electrodes is not increased, and hence the near-infrared radiation efficiency is not lowered. Of course, since mercury adversely affects the environment, it is desirable to remove mercury from the lamp.

In the above invention and each of the following inventions, the following definitions and technical meanings are imparted to the terms unless any particular definition or technical meaning is designated.

In the invention, the visible region and near-infrared region mean the wavelength ranges of 380–780 nm and 750–1100 nm, respectively. The overlapping range of 750–780 nm exhibits a low visibility and hence the light of this range is not dazzling. Further, CCD cameras show a high sensitivity to the light of this range, therefore it is used as the near-infrared radiation.

The refractory and light-transmitting hermetic vessel that forms a light emission tube is generally called a bulb, and is made of hard glass, such as quartz glass, alumina silicate glass, etc., or a light-transmitting ceramics such as alumina, etc. The sealing portion provided at an end of the light emission tube can be formed by pressure sealing or shrinkage if the light emission tube is made of glass. On the other hand, if the tube is made of ceramics, the disk or cap can be sealed by, for example, a compound. Such a sealing portion may be provided on one end or on each of the opposite ends. Further, a chamber formed in the vessel may be cylindrical, elliptic, spherical, or a combination thereof.

It is a matter of course that the hermetic vessel should be airtightly sealed. However, the hermetic vessel may have a single tube structure, or a double tube structure in which a light emission tube is contained in a light-transmitting outer tube, and these tubes are coupled to each other at their opposite ends, or a multi-tube structure in which a protector tube is provided in addition to the light emission tube and outer tube. Moreover, the interior of the outer tube with the light emission tube contained therein may be kept in a vacuum state or an inert gas atmosphere, or communicate with the outside air.

The metal vapor discharge lamp may be formed of, for example, a short-arc type metal halide lamp.

The discharge medium sealed in the hermetic vessel emits light when energy is applied thereto. The discharge medium contains a halide which is a halide of at least one metal selected from sodium (Na), scandium (Sc), and rare earth metals, such as dysprosium (Dy), thulium (Tm), Holmium (Ho), neodymium (Nd), etc that emit visible light.

Further, the discharge medium contains a halide which is a halide of at least one metal selected from potassium (K), cesium (Cs) and rubidium (Rb) that emit near-infrared.

As described in Jpn. Pat. Application No. 10-28134 (Jan. Pat. Appln. KOKAI Publication No. 11-238488), a halide containing aluminum Al or zinc Zn that generates a relatively high vapor pressure, and whose metal emits a smaller amount of visible light than the above-mentioned visible-light generating materials can be sealed instead of Hg. A lamp that does not contain Hg is stable in electrical characteristics and it is of course environmentally friendly.

The expression "substantially disusing mercury" is intended to mean that no mercury is contained, and also to permit the existence of Hg if the amount of Hg per cc of the hermetic vessel is less than 0.3 mg, preferably 0.2 mg or less.

In the above description, iodine I, bromine Br or chlorine Cl can be used as the halogen in the halide, in the form of, for example, an iodide or bromide.

Further, xenon Xe, argon Ar, krypton Kr, etc. can be used as the rare gas. If the sealed pressure is set to approx. $1 \times 10^2$ kPa or more, at maximum, approx. $15 \times 10^2$ kPa, the start-up characteristic of the luminous flux can be enhanced, which is suitable for, for example, the headlamps of vehicles.

The material of the light emission tube and the material and quantity of the sealed discharge medium can be appropriately selected in accordance with the required characteristics and the type of discharge lamp.

The pair of electrodes may be formed of a bar of, for example, pure tungsten, or formed by winding the electrode bars with coils or by attaching a sintered product to the electrode bars. The tips of the electrode bars may serve as electrodes. If the distance between the pair of electrodes falls within a range of 1 mm to 6 mm, the electrodes form point light sources, thereby enhancing the light focusing characteristics. Further, if lighting is performed using alternating current, the electrodes may have the same structure. However, in the case of direct-current lighting, the temperature of the anode is abruptly increased, therefore it is preferable that the radiation section of the anode is made larger than the cathode.

The discharge lamp can be lit using either alternating current or direct current, and may have any type of circuit structure. However, in the case of, for example, a vehicle headlamp, using a direct current from a battery enables the circuit structure to be simplified. Further, if the lighting circuit is constructed such that it supplies a current three times or more a rated lamp current after the metal vapor discharge lamp is lit, and reduces the current with a lapse of time, the start-up characteristic of the luminous flux can be enhanced. This is preferable when the lamp is used as the headlamp of a vehicle.

A metal vapor discharge lamp according to a second embodiment comprises:

a refractory and light-transmitting hermetic vessel;

a pair of electrode fixed to the hermetic vessel; and a discharge medium sealed in the hermetic vessel, the discharge medium containing a first halide and a rare gas, the first halide containing a halide of at least one of sodium (Na), scandium (Sc) and a rare earth metal which radiate visible light (380–780 nm), wherein a ratio of visible-radiation power (380–780 nm) to near-infrared radiation power (750–1100 nm) falls within a range of 0.5:1 to 4.0:1, the visible-radiation power and the near-infrared radiation power being output when the metal vapor discharge lamp is in an ON state.

This discharge lamp is suitable for a single lamp used for both visible radiation and near-infrared radiation.

In the invention, if the near-infrared radiation (750–1100 nm) power (output) is 1, the visible radiation (380–780 nm) power (output) is 0.5 to 4.0. In other words, the near-infrared radiation power is ¼ to twice the visible radiation power.

If the ratio of the near-infrared radiation power (output) to the visible radiation power (output) is less than ¼, the near-infrared radiation power is too low to be used for, for example, an infrared recognition device. On the other hand, if the ratio exceeds 2, the visible radiation power is too low to be used for, for example, the headlamp of a vehicle.

The visible and near-infrared radiation power outputs are measured (computed) in the following manner. Firstly, in the visible region, the discharge lamp is lit in the integrating sphere, as in the case of standard illumination lamps, thereby measuring the power (W) of radiation of each wavelength in the visible region. Subsequently, the relative radiation power between 200–2000 nm is measured by spectroscopy. As a result of these two measurements, the power (W) of radiation of each wavelength in the range of 200–2000 nm is obtained.

The first halide contains at least one of sodium (Na), scandium (Sc) and a rare earth metal which radiate visible light (380–780 nm).

These light-emitting materials are limited to metal halides whose metals radiate visible light of a predetermined wavelength region and ultraviolet light of a predetermined wavelength region, and which are suitable for general purposes in light of the emission efficiency and color rendering properties. Any one or more of the halides can be used.

A metal vapor discharge lamp according to a third embodiment of the invention is characterized in that the halide contains at least one of a halide of potassium (K), cesium (Cs) and rubidium (Rb) which radiate light of near-infrared wavelengths (750–1100 nm).

The spectral lines of potassium (K) exist at 766.4 nm, 769.8 nm, 1168.9 nm and 1177.1 nm. Similarly, those of cesium (Cs) exist at 760.9 nm, 801.5 nm, 807.9 nm, 852.1 nm, 876.1 nm, 894.3 nm, 917.2 nm, 920.8 nm, 1002.0 nm and 1012.0 nm. Those of rubidium (Rb) exist at 775.7 nm, 775.9 nm, 761.9 nm, 780.0 nm, 794.7 nm and 887.3 nm. Thus, these light emission materials provide high radiation power outputs in the near-infrared region of approx. 750–1100 nm.

A metal vapor discharge lamp according to a fourth embodiment of the invention is characterized in that the discharge medium includes:

a first halide which is a halide of at least one metal selected from sodium (Na), scandium (Sc) and a rare earth metal;

a second halide which generates a relatively high vapor pressure and being a halide of at least one metal which emits a visible light less than that emitted by the metal of the first halide; and a third halide containing a halide of at least one metal which radiates near-infrared light, the discharge medium substantially excluding mercury.

In this invention, the halide employed in the third embodiment, which is of at least one metal selected from the group consisting of sodium (Na), scandium (Sc) and a rare earth metal that emit visible light, and the vapor pressure of a halide of which is not so high when the lamp is lit, is sealed as the first halide.

Further, the sealed second halide is a halide whose vapor pressure when the lamp is lit is relatively high, and whose metal is of at least one metal selected from the group consisting of magnesium Mg, iron (Fe), cobalt (Co), chrome (Cr), zinc (Zn), nickel (Ni), mangan (Mn), aluminum (Al), antimony (Sb), beryllium (Be), rhenium (Re), gallium (Ga), titanium (Ti), zirconium (Zr), hafnium (Hf), tin (Sn), etc., which less easily radiates visible light than the metal contained in the first halide.

The expression "high vapor pressure" means a pressure lower than a mercury vapor lamp pressure, and preferably the pressure in the hermetic vessel when the lamp is lit is approx. 5 atoms or less. Further, the expression "less easily radiating visible light than the metal contained the first halide" does not mean that the absolute visible radiation amount is small, but means that the visible radiation amount is relatively small.

Actually, iron (Fe) and nickel (Ni) radiate a larger amount of ultraviolet light than visible light, whereas titanium (Ti), aluminum (Al), zinc (Zn), etc. radiate a larger amount of visible light.

If the metals that radiate a large amount of visible light are made to individually radiate, all of them radiate a large amount visible light since the energy applied to them concentrates thereon. However, if the metal of the second halide less easily radiates light than the metal of the first halide because the energy level required for the former to radiate is higher than the latter, when the first and second halides coexist, energy concentrates on the first halide, and the amount of radiation of the metal of the second halide becomes small.

The vapor pressure of most halides, such as $AlI_3$, $ZnI_2$, etc., is lower than that of mercury, and the adjustment range of the lamp voltage is narrower than in the case of mercury. However, the adjustment range of the lamp voltage can be widened by appropriately sealing some of the halides.

Further, the second halide is not inhibited from radiating visible light, but may radiate visible light if the ratio of the visible radiation amount to the total radiation amount of the lamp is small and the influence of the visible radiation is small.

The expression "substantially disusing mercury" is intended to mean that no mercury is contained, and also to permit the existence of Hg if the amount of Hg per cc of the hermetic vessel is less than 0.3 mg, preferably 0.2 mg or less.

The third halide contains at least one of potassium (K), cesium (Cs) and rubidium (Rb) which radiate near-infrared light as specified in the fourth embodiment.

As described above, the discharge lamp is sealed with three types of halide, i.e., the first halide comprising a metal that radiates visible light of a predetermined wavelength range, the second halide the vapor pressure of which is relatively high and comprising a metal which less easily radiates visible light than the metal of the first halide, the second halide being sealed instead of mercury, and the third halide comprising a metal which radiates near-infrared light of a predetermined wavelength range.

In this discharge lamp, the evaporation of the sealed second halide provides a predetermined lamp voltage. Further, this discharge lamp is environ-mentally friendly because it contains no or little mercury.

Accordingly, the metal vapor discharge lamp of the invention can operate with mercury substantially excluded, and have substantially the same electrical and emission characteristics as conventional lamps sealed with mercury.

To simultaneously utilize visible radiation and near-infrared radiation, the lamp may be sealed with Hg or be free of Hg. However, to be environmentally friendly, a Hg-free lamp is desirable. In Europe, a proposal that Hg used in the vehicles placed on sale should be gradually reduced to zero was issued as an ELV (End of Life Vehicles) proposal in September in 1996. This proposal was adopted in the European Conference held Feb. 3, 2000. Thus, the use of Hg was principally forbidden. Hg-free HID headlamps were intended to be approved in GRE (Groupe de Rapporteuss le Eclairage) of October, 2002, and to be adopted in the ECE Regulation of July, 2003. All Hg-filled HID headlamps will thus be shifted to Hg-free headlamps in the near future.

A metal vapor discharge lamp according to a fifth embodiment is characterized by a visible-light blocking filter.

The visible-light blocking filter is provided in a bulb itself that forms the hermetic vessel, or on a surface of the bulb, thereby reducing or blocking visible radiation to enhance the ratio of near-infrared radiation.

Specifically, the bulb material is mixed with a material that reduces or blocks visible radiation, or a surface of the bulb is covered with a film that blocks visible-light and permits near-infrared light to pass therethrough, utilizing interference, the film being formed by alternately stacking high and low refraction factor films.

A metal vapor discharge lamp according to a sixth embodiment is characterized in that its wattage rating is 100 W or less. This lamp is most suitable for the headlamp or projector of vehicles.

A metal vapor discharge lamp according to a seventh embodiment is characterized in that the distance between a pair of electrodes falls within a range of 1 mm to 6 mm. This lamp is most suitable for the headlamp or projector of vehicles.

A metal vapor discharge lamp according to an eighth embodiment is characterized in that the rare gas is Xe of five atoms or more. Increase of the Xe pressure quickens the start-up of luminous flux. In other words, stable radiation can be obtained in a short time. This is especially important if the lamp is used as the headlamp of a vehicle.

A first embodiments of a projector of the present invention is characterized by comprising: a reflector; a metal vapor discharge lamp as specified in any one of the first to eighth embodiments, the metal vapor discharge lamp being provided on the reflector; and a light control member covering a front surface of the reflector.

In this structure, the metal vapor discharge lamp in which the visible radiation is reduced or blocked and the near-infrared radiation is relatively increased is provided in a reflector, and a light control member, such as a lens or globe, is provided at an opening in the reflector.

The light control member controls the visible and near-infrared radiation from the discharge lamp, thereby providing a predetermined light distribution and preventing the discharge lamp in the reflector from being broken or contaminated by, for example, dust.

The light control member is not limited to a member for controlling the radiation distribution, but also includes, for example, a globe just for protection of the discharge lamp and reflector.

The projector can irradiate light of a wide wavelength range from the near-infrared region to the visible region, and is used as an illumination or monitoring device installed indoors or outdoors, or as the headlamp of vehicles, such as automobiles or trains.

For example, the projector can be incorporated in a near-infrared photography system in which the discharge lamp of the projector applies near-infrared light to a subject (person), and a near-infrared photography device being sensitive to the near-infrared region catches the near-infrared light reflected from the subject to recognize it.

This near-infrared photography system can record comings and goings of visitors and/or monitor/detect intruders for security in banking facilities, defense facilities, airports, highways, etc.

A projector according to a second embodiment is characterized in that a visible-light blocking filter is provided on at least one of front and rear surfaces of the light control member.

To further increase the ratio of infrared radiation, the light control member may be formed by adding a material that reduces or blocks the visible region. Alternatively, a surface of the light contact member may be formed of a visible-region blocking filter comprising a multi-layer interference film. Also, such a visible-region blocking filter may be attached to the outer or inner surface of the light control member.

The visible-region blocking filter may be stationary or movable relative to the light control member.

A projector according to a third embodiment of the invention is characterized in that the projector of the first or second embodiment is installed in a vehicle.

Vehicles equipped with the projector can use the projector as the headlamp and irradiate both visible light and infrared light. The vehicle headlamp irradiates a subject (person) with infrared light, and a CCD camera or infrared detecting device, etc. receives infrared light reflected from the subject (person) and forms its image. The driver can recognize the existence of an obstacle (person) on the road from the image, an alarm indicative of the obstacle, etc., therefore can take a quick countermeasure.

This headlamp is suitable for a vehicle headlamp whose wattage rating is 100 W or less, and may be used only for detection utilizing infrared radiation, or used for both illumination utilizing visible radiation and detection utilizing infrared radiation. Of course, even if the lamp is dedicated to detection utilizing infrared radiation, some visible light may be emitted.

A projector according to a fourth embodiment of the invention is characterized by comprising visible-light blocking means for blocking visible radiation and passing infrared radiation therethrough in a high beam mode, and means for removing the visible-light blocking means from the radiation direction of the lamp in a low beam mode.

In the four-lamp system employed in most vehicles at present, a pair of halogen lamps are used as the light sources in the high beam mode, and a pair of metal vapor discharge lamps are used as the light sources in the low beam mode.

In the embodiment of the invention, the metal vapor discharge lamp is lit in the high beam mode, and the visible-light blocking means blocks visible light, thereby enabling an infrared recognition device to sense infrared light. As a result, pedestrians located at a distance from the vehicle can be noticed without being dazzled.

When the projector switches to the low beam mode, the visible-light blocking means is removed to irradiate visible light used as the low beam. In this case, when the mode is switched to the low beam mode, the halogen lamps usually used in the high beam mode may be temporarily used in the low beam mode.

In the two-lamp system in which only discharge lamps are provided at the opposite ends of a vehicle, these lamps may be used in the following manner. In the high beam mode, visible light is irradiated as the high beam. At this time, to suppress dazzle, light adjustment may be performed or the lamps themselves may be modified. In the low beam mode, the visible-light blocking means is operated to block visible light, thereby operating the infrared recognition device. In this case, if visible radiation is not blocked, the image obtained by a CCD camera will be fogged by halation. This is because usual CCD cameras also show high sensitivity to visible light, as is illustrated in FIG. 8. If the detection level of the CCD camera is reduced to avoid it, its infrared recognition capability is reduced. In the low beam mode, the visible light may be used as the low beam, without removing the visible-light blocking means.

The expression "visible-light blocking" is intended to mean "complete blocking of visible light" or "reduction of visible light".

A metal vapor discharge lamp lighting device according to an embodiment of the invention is characterized by comprising a metal vapor discharge lamp according to any one of the first to eighth embodiments; and a lighting circuit which supplies a current three times or more a rated lamp current after the metal vapor discharge lamp is lit, and reduces the current with a lapse of time.

In the embodiments of the invention, the lighting circuit constructed as the above satisfies the start-up characteristics of the luminous flux and infrared radiation required for, for example, the headlamps of vehicles. The lighting circuit may be operated by either alternating current or direct current. U.S. Pat. No. 6,353,289 is incorporated herein by reference for the lighting circuit.

Additional objects and advantages of the invention will be set forth in the description which follows, and in part will be obvious from the description, or may be leaned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate an embodiment of the invention, and together with the general description given above and the detailed description of the embodiment given below, serve to explain the principles of the invention.

DETAILED DESCRIPTION OF THE INVENTION

Figure 1:
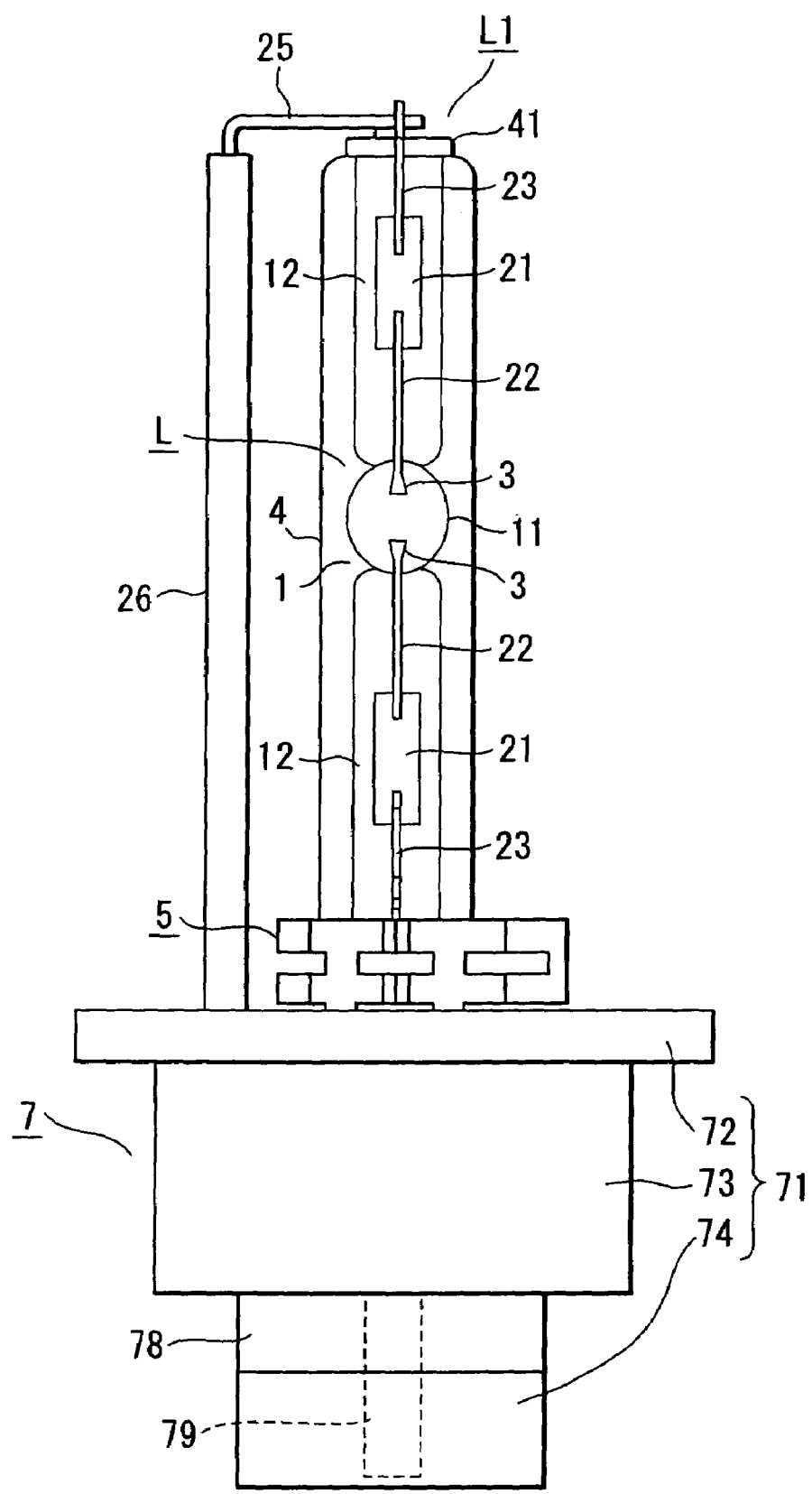
FIG. 1 is a front view illustrating a metal vapor discharge lamp according to an embodiment of the invention.

Referring to FIG. 1, a first embodiment of the invention will be described. FIG. 1 is a front view illustrating a single-head metal tubular bulb L1 of a double-tube structure in which a light emission tube formed of a metal vapor discharge lamp is airtightly contained in an outer tube.

In the discharge lamp L1, a light emission tube L is formed of, for example, a small metal vapor discharge lamp of a short-arc type is airtightly contained in an outer tube 4.

In FIG. 1, reference numeral 1 denotes a refractory, light-transmitting airtight bulb that has a substantially spherical or elliptic chamber 11 swollen at a central position. A pair of sealing sections 12 formed by melting and pressing glass tube sections are provided at the opposite ends of the chamber 11.

Each sealing section 12 airtightly contains a metal leaf 21 formed of, for example, molybdenum. An electrode bar 22 mainly formed of tungsten extends from one end of each metal leaf 21 into the chamber 11, while an external lead wire 23 formed of, for example, molybdenum and extending to the outside of the bulb 1 is coupled to the other end of each metal leaf 12 by, for example, welding. The respective tips of the electrode bars 22 serve as discharge electrodes 3, and oppose each other with a predetermined gap in the chamber 11.

The chamber 11 is sealed with a halide metal and predetermined rare gas as mediums of discharge, described later. Further, the outer tube 4 is a quartz glass cylinder, and has a joint 41 at which an end of the bulb 1 having its opposite ends contained therein is formed integral with the outer tube 4 by, for example, heating/contraction. This welding may be airtight welding that makes the outer tube 4 contain a vacuum or rare gas atmosphere, or may be non-airtight welding that makes the tube 4 communicate with the outside air.

A substantially rectangular metal casing 5 is provided at the lower end of the cylindrical outer tube 4 such that the sides of the casing 5 surround the lower end. The metal casing 5 is attached to the outer tube 4 such that the former surrounds the latter, by welding their edges (not shown) to each other. Further, a plurality of chips (not shown) provided at the metal casing 5 are secured, by welding, on the upper surface of a fixing member (not shown).

Reference numeral 7 denotes a cap having a main unit 71 that has three outer diameters and comprises a large-diameter flange section 72 formed of a heat-resistant, electrically insulating synthetic resin, such as polyphenylamide or polyethylimide, a main unit section 73 and a small-diameter terminal-forming section 74. The above-mentioned metal casing 5 with the outer tube 4 is fitted in an opening (not shown) formed in the main unit 71, together with a fixing member (not shown). The resultant structure is fixed by a mechanical engagement means or heat resistant adhesive.

The external lead wire 23 led from the upper end of the outer tube 4 is connected to a lead wire 25. The lead wire 25 is passed through the guide hole of the cap 7 and connected to a plate-like terminal section 78 provided in the terminal-forming section 74. On the other hand, the outer lead wire 23 led from the lower end is connected to a pin-shaped terminal section 79 provided in the terminal-forming section 74. Reference numeral 26 denotes an insulated tube formed of, for example, ceramic and covering the exposed portion of the lead wire 25.

The outer tube 4 and cap 7 are secured to each other after the discharge electrodes 3, the flange section 72 of the cap 7, etc. are positioned.

In the metal vapor discharge lamp L1 of the embodiment, when the cap 7 is connected to a socket (not shown) connected to a lighting circuit device having, for example, a ballast, and is turned on, a predetermined voltage is applied to the discharge electrodes 3 via the external lead wires 23, metal leaves 21 and electrode bars 22 also serving as internal lead wires, which are electrically connected to the terminal sections 78 and 79 (one of the external lead wires 23 is electrically connected via the lead wire 25). As a result of the voltage application, a discharge occurs between the electrodes 3 in the light emission tube 1, and stable lighting is performed by the lighting circuit device.

A more detailed description will now be given of the above-described discharge lamp of the embodiment.

EXAMPLE 1

In the following Table 1, 1A–1D denote lamps (light emission tubes L) containing materials that exhibit relatively high radiation power (output) in the near-infrared region (750–1100 nm). In each light emission tube L, the wattage rating is 35 W, the entire length of the airtight bulb, including both the sealing sections 12, is approx. 50 mm, the outer and inner diameters of the maximum-diameter portion of the substantially elliptic chamber 11 having its central portion swollen is approx. 6 mm and approx. 2.7 mm, respectively, the inner volume of the chamber 11 is approx. 0.05 cc, and the pair of discharge electrodes 3 oppose each other with a distance of approx. 4 mm.

Further, the chambers 11 of the light emission tubes L (1A–1D) are filled with the materials shown in Table 1 and mercury free. Table 1 illustrates the radiation power outputs (W) of each light emission tube L (1A–1D) in the visible region V (380–780 nm) and the near-infrared region R (750–1100 nm), and the power ratio V/R. 1H in Table 1 represents a conventional halogen bulb of 35 W for comparison.

TABLE 1

| Light emission tube No. | Sealed materials | | | Input (W) | Radiation power V (W) in visible region (380–780 nm) | Radiation power R (W) in near-infrared region (750–1100 nm) | V/R |
|---|---|---|---|---|---|---|---|
| | Xe (atm) | Halide and others | | | | | |
| 1A | 10 | CsI | 0.4 mg | 35 | 2.6 | 10.2 | 0.25/1 |
| 1B | 10 | KI | 0.4 mg | | 4.0 | 9.9 | 0.40/1 |
| 1C | 10 | RbI | 0.4 mg | | 3.2 | 10.3 | 0.31/1 |
| 1D | 10 | KI | 0.2 mg + CsI 0.2 mg | | 4.4 | 9.8 | 0.45/1 |
| 1H | | (Halogen bulb for comparison) | | 35 | 4.9 | 7.3 | 0.67/1 |

Figure 2:
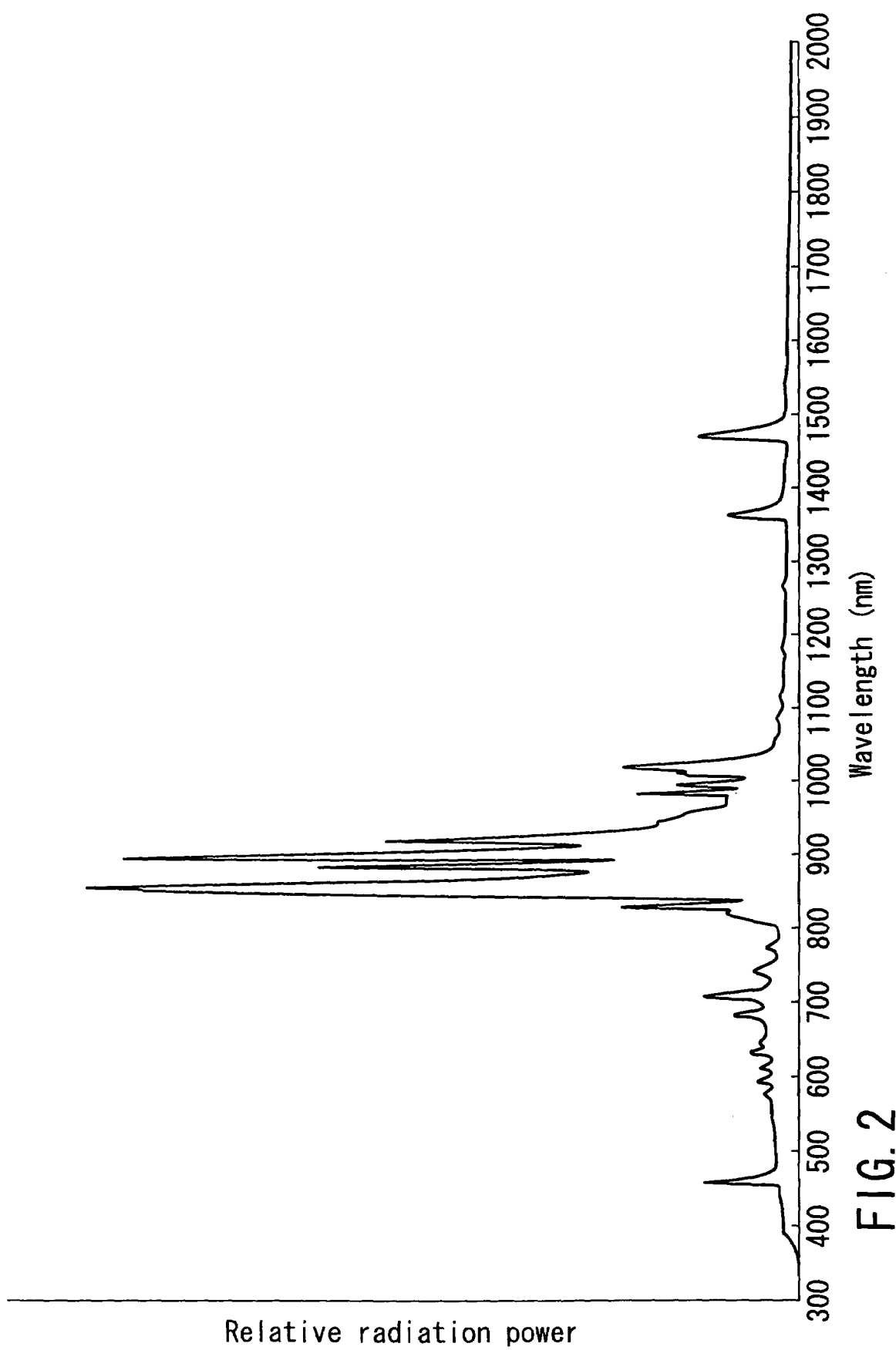
FIG. 2 is a graph illustrating the spectroscopic distribution (300 to 2000 nm) of a radiation tube (1A) sealed with CsI according to the invention.

FIG. 2 shows the spectroscopic distribution (300–2000 nm) characteristic of the light emission tube 1A (sealed with CsI) in Table 1 (the abscissa indicates "wavelength" (nm), and the ordinate indicates "relative radiation power"). It is understood from FIG. 2 that most of the light output by the light emission tube 1A is in the near-infrared wavelength range of 800–1000 nm, i.e., around 900 nm.

Figure 3:
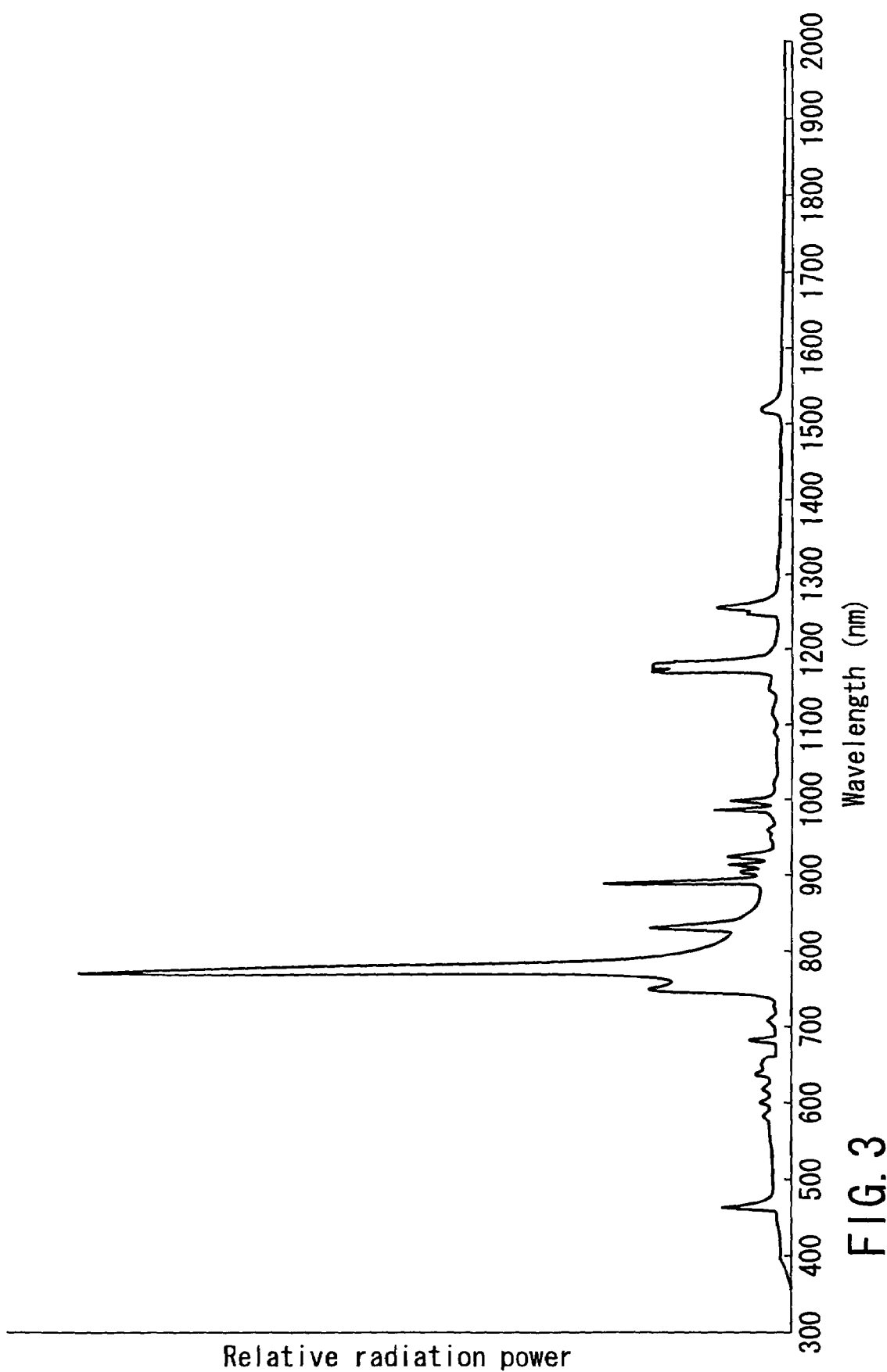
FIG. 3 is a graph illustrating the spectroscopic distribution (300 to 2000 nm) of a radiation tube (1B) sealed with KI according to the invention.

FIG. 3 shows the spectroscopic distribution (300–2000 nm) characteristic of the light emission tube 1B (sealed with KI) in Table 1 (the abscissa indicates "wavelength" (nm), and the ordinate indicates "relative radiation power"). It is understood from FIG. 3 that most of the light output by the light emission tube 1B is the light of potassium (K) with a wavelength of 766.4 and 769.8 nm.

Further, the light emission tube 1C (sealed with RbI) irradiates strong light in the near-infrared wavelength range of 770–800 nm (its spectroscopic distribution characteristic is not shown).

As is evident from Table 1, in the light emission tubes 1A–1D, the radiation power in the near-infrared region is much higher than that in the visible region, and most of the radiation power output when the tubes are ON is in the near-infrared region. Furthermore, the radiation power of the tubes 1A–1E is higher than that of the conventional halogen bulb 1H by approx. 40%.

EXAMPLE 2

In the following Table 2, 2A–2G denote lamps (light emission tubes L) containing materials that exhibit almost the same radiation power (output) between the visible region (380–780 nm) and near-infrared region (750–1100 nm). These lamps are suitable to be simultaneously used as illumination light sources for headlamps and as infrared light sources for infrared recognition devices, which will be described later.

In each light emission tube L, the wattage rating (input) is 40 W, the entire length of the airtight bulb, including both the sealing sections 12, is approx. 50 mm, the outer and inner diameters of the maximum-diameter portion of the substantially elliptic chamber 11 having its central portion swollen is approx. 6 mm and approx. 2.7 mm, respectively, the inner volume of the chamber 11 is approx. 0.05 cc, and the pair of discharge electrodes 3 oppose each other with a distance of approx. 4 mm.

Further, the chambers 11 of the light emission tubes L (2A–2G) are sealed with the materials shown in Table 2.

TABLE 2

| Light emission tube No. | Input (W) | Sealed materials | | | | | | |
|---|---|---|---|---|---|---|---|---|
| | | Xe (atm) | NaI (mg) | ScI$_3$ (mg) | ZnI$_2$ (mg) | Hg (mg) | Others | |
| 2A | 40 | 6 | 0.5 | 0.1 | — | 0.7 | CsI 0.4 mg | |
| 2B | | 6 | 0.5 | 0.1 | — | 0.7 | KI 0.4 mg | |
| 2C | | 6 | 0.5 | 0.1 | — | 0.7 | RbI 0.4 mg | |
| 2D | | 10 | 0.5 | 0.1 | 0.2 | — | CsI 0.2 mg + KI | 0.2 mg |
| 2E | | 10 | 0.5 | 0.1 | 0.2 | — | KI 0.2 mg + RbI | 0.2 mg |
| 2F | | 10 | 0.5 | 0.1 | 0.2 | — | RbI 0.4 mg | |
| 2G | | 10 | 0.5 | 0.1 | 0.2 | — | KI 0.4 mg | |
| 2H | 35 | 6 | 0.5 | 0.1 | — | 0.7 | — | |

Figure 4:
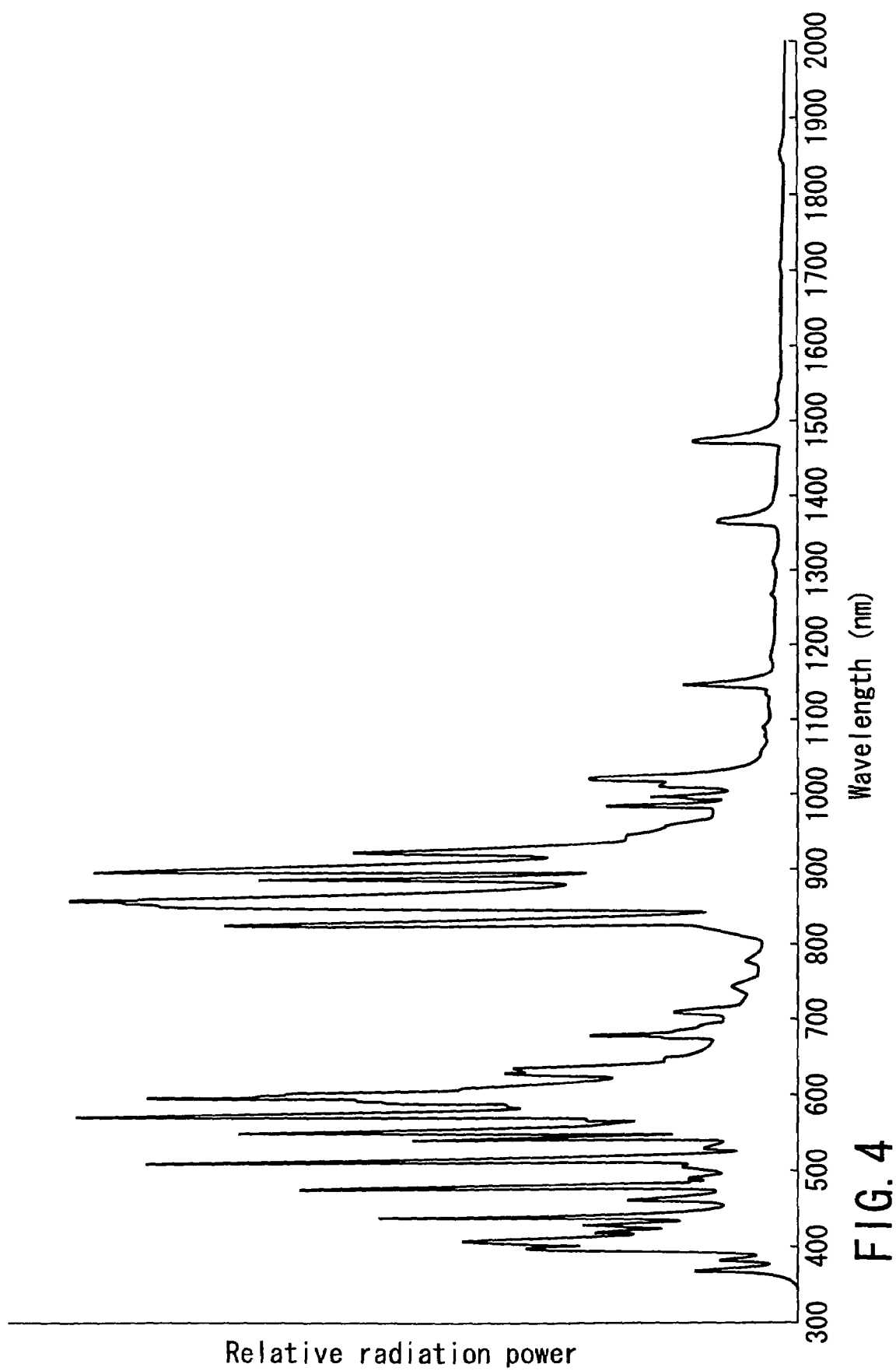
FIG. 4 is a graph illustrating the spectroscopic distribution (300 to 2000 nm) of a radiation tube (2A) sealed with (NaI+$ScI_3$+Hg+CsI) according to the invention.
Figure 5:
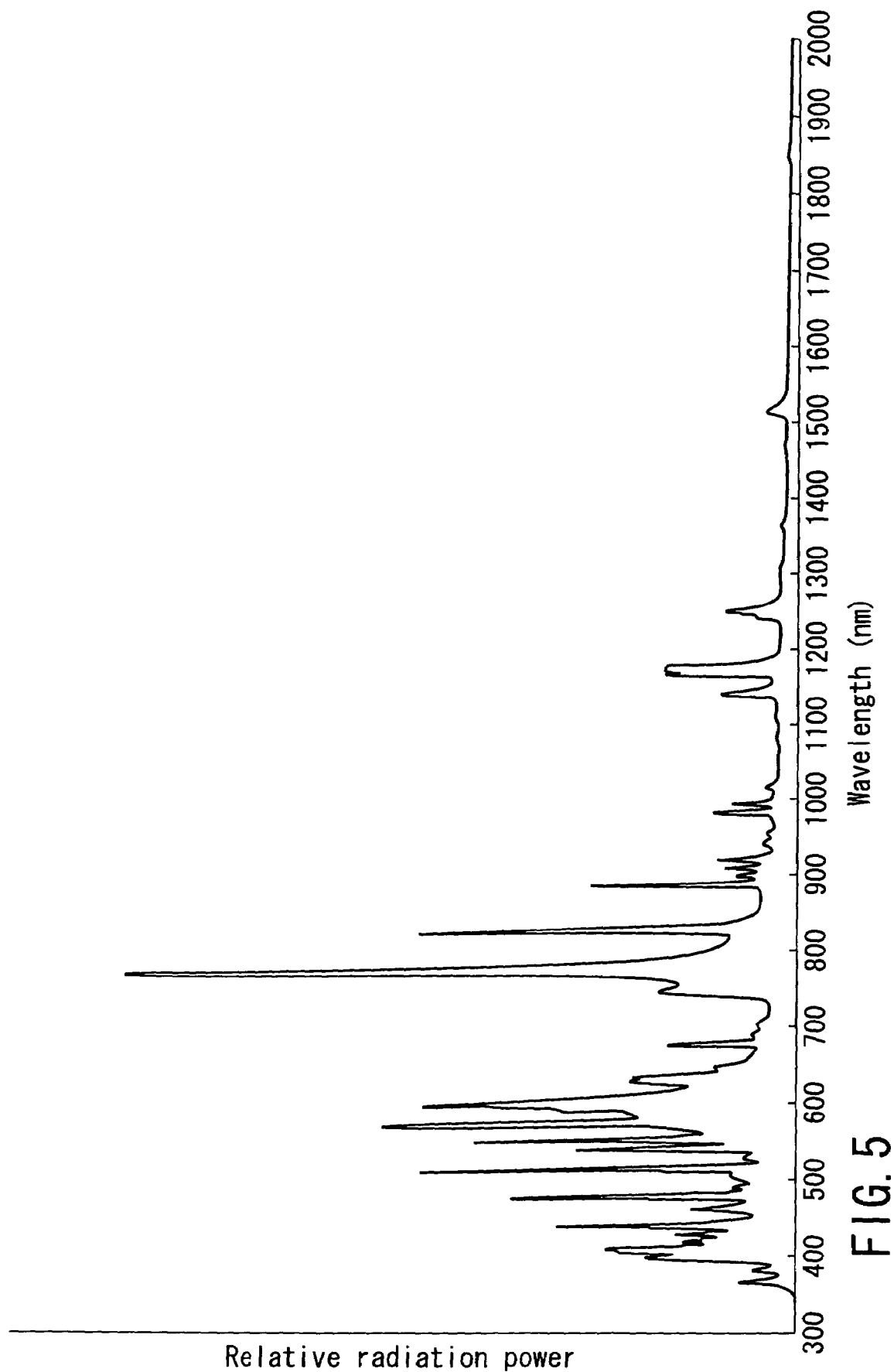
FIG. 5 is a graph illustrating the spectroscopic distribution (300 to 2000 nm) of a radiation tube (2B) sealed with (NaI+$ScI_3$+Hg+KI) according to the invention.

FIG. 4 shows the spectroscopic distribution (300–2000 nm) characteristic of the light emission tube 2A (sealed with NaI+ScI$_3$+Hg+CsI+Xe) appearing in Table 2. Similarly, FIG. 5 shows the spectroscopic distribution (300–2000 nm) characteristic of the light emission tube 2B (sealed with NaI+ScI$_3$+Hg+KI+Xe) appearing in Table 2.

The light emission tube 2A exhibits the same characteristic as the conventional tube 2H in the visible region, and the same characteristic as the above-described light emission tube 1A in the near-infrared region. Further, the light emission tube 2B exhibits the same characteristic as the conventional tube 2H in the visible region, and the same characteristic as the above-described light emission tube 1B in the near-infrared region.

Further, in the light emission tubes 2A–2C and 2H, the sealed mercury (Hg) radiates weak light in the visible region. The light emission tubes 2D–2G are sealed, instead of Hg, with zinc iodide (ZnI$_2$) as an alternative. Therefore, in the light emission tubes 2D–2G, zinc (Zn) radiates weak light in the visible region.

As described above, since Hg and Zn do not greatly contribute to the spectroscopic distribution in the visible region, the spectroscopic characteristics of the light emission tubes 2A–2C and 2H are similar to those of the light emission tubes 2D–2G.

Table 3 illustrates the radiation power outputs (W) of each light emission tube L (2A–2G) in the visible region V (380–780 nm) and the near-infrared region R (750–1100 nm), the power ratios V/R, and the total luminous flux values. 2H in Table 2 represents a conventional discharge lamp of 35 W for comparison.

TABLE 3

| Light emission tube No. | Input (W) | Radiation power V (W) in visible region (380–780 nm) | Radiation power R (W) in near-infrared region (750–1100 nm) | V/R | Total luminous flux (lm) |
|---|---|---|---|---|---|
| 2A | 40 | 7.6 | 8.5 | 0.89/1 | 2780 |
| 2B |    | 8.2 | 8.3 | 0.99/1 | 2970 |
| 2C |    | 7.4 | 8.4 | 0.88/1 | 2700 |
| 2D |    | 7.2 | 8.8 | 0.82/1 | 2630 |
| 2E |    | 8.0 | 8.6 | 0.93/1 | 2900 |
| 2F |    | 7.3 | 8.1 | 0.90/1 | 2650 |
| 2G |    | 8.0 | 8.2 | 0.98/1 | 2680 |
| 2H | 35 | 9.5 | 1.5 | 6.33/1 | 3450 |

It is understood from Table 3 that if the radiation power (output) in the near-infrared region is increased, the radiation power (output) in the visible region is reduced, but the radiation efficiency in the region (380–1100 nm) ranging from the visible region to the near-infrared region is increased. Accordingly, the degree of reduction in the visible-radiation power (output) is not so high, compared to the degree of increase in the near-infrared radiation power.

For example, vehicle headlamps require a total luminous flux of 2000 lm or more, desirably 2500 lm or more. Therefore, the input to each light emission tube L (2A–2G) is set to 40 W, although the tubes (2A–2H) are set to have the same size.

However, regardless of the fact that the load on the tubes 2A–2G is thus increased, the tubes 2A–2H have almost the same life. This is because potassium K, cesium Cs, rubidium Rb, etc. requires a low ionization voltage, which reduces arc temperature required for arc discharge.

The use of such a material as the above enables much near-infrared radiation to be acquired with the total luminous flux not so greatly reduced. This means that visible radiation and near-infrared radiation can be achieved by a single lamp.

It is necessary to limit, to the range of 0.5:1 to 4.0:1, the ratio of the total radiation power (output) of a light emission tube (lamp) (this lamp irradiates both visible light and near-infrared light) in the visible region (380–780 nm) to that in the near-infrared region (750–1100 nm). When the ratio is 0.5:1, if 40 W is supplied to the lamp, this lamp provides a total luminous flux of approx. 1900 lm and a total radiation power output of 10 W or more in the near-infrared region. This is satisfactory. To acquire a total luminous flux of 2000 lm or more, the wattage rating is set to more than 40 W.

Further, when the ratio is 4.0:1, if 60 W is supplied to the lamp, a near-infrared radiation power output of approx. 5 W can be acquired.

Figure 6:
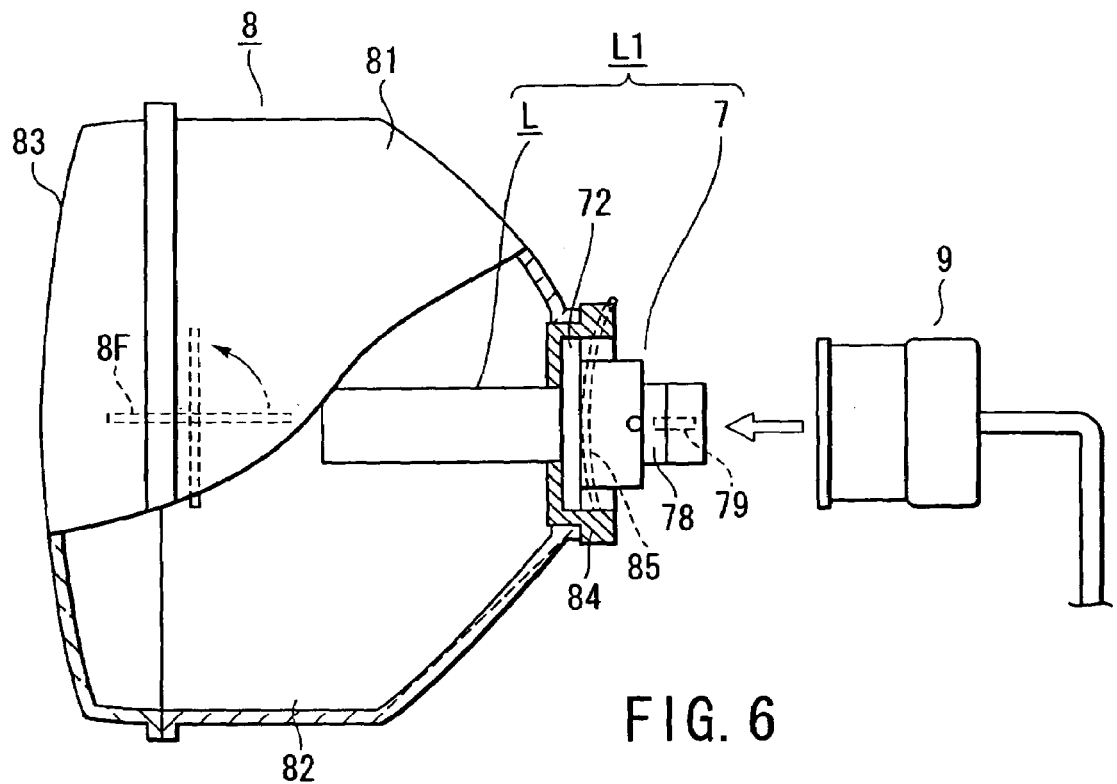
FIG. 6 is a partly-broken longitudinal section, illustrating a projector (headlamp of a vehicle) according to an embodiment of the invention.

Referring to FIG. 6, a projector according to an embodiment of the invention will be described. This projector is a lamp instrument 8 serving as a headlamp for vehicles. FIG. 6 is a longitudinal sectional partly-broken view of the head lamp. In the figure, elements similar to those shown in FIG. 1 are denoted by corresponding reference numerals, and no description is given thereof.

In FIG. 6, reference numeral 81 denotes a reflector (mirror) formed by attaching a reflection film (not shown) made of, for example, aluminum to the inner surface of a reflector body 82 made of a heat-resistant synthetic resin, hard glass or metal plate. A light control member 83 represented by a lens that is designed to exhibit a predetermined light distribution characteristic is provided at the front opening of the reflector 81.

The flange section 72 of the above-described discharge lamp L1 is inserted into and positioned in the through hole of a holder 84 provided at a central portion of the back surface of the reflector body 82. As a result, the flange section 72 is held from behind by the holder 84 through a spring member 85, thereby completing the lamp instrument 8.

In the lamp instrument 8 constructed as the above, since the lamp L1 having a high accuracy dimensional and positional relationship between the light source section and cap 7 is employed, a predetermined light distribution characteristic, in which the range of variations is small, can be obtained when a socket 9 is connected to the cap 7 and the lamp instrument is turned on by a lighting circuit device connected thereto via the socket 9.

Figure 7:
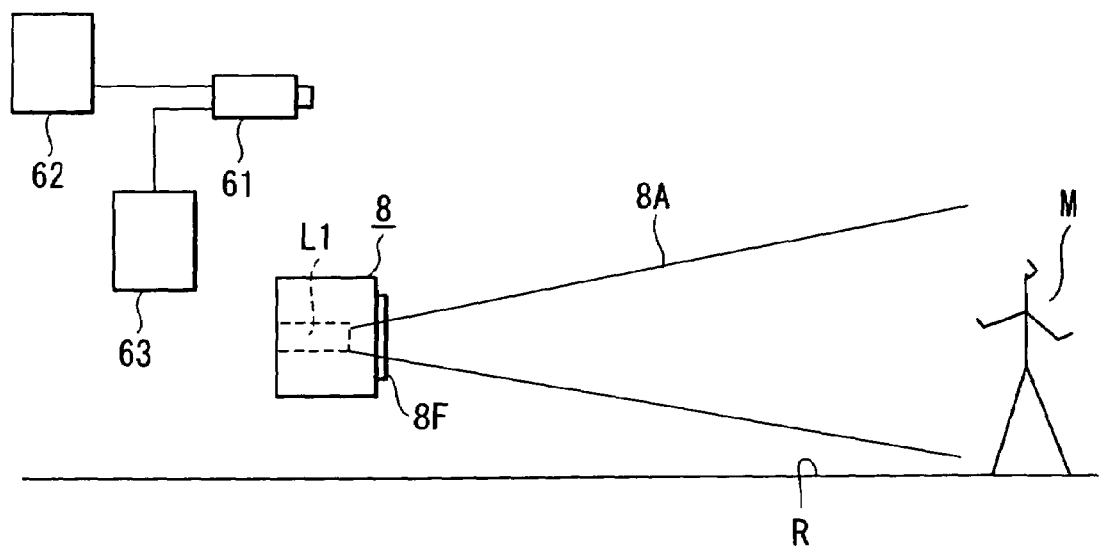
FIG. 7 is a schematic useful in explaining an infrared photography system for sensing light of near-infrared wavelengths irradiated from the headlamp of a vehicle.

FIG. 7 is a schematic explaining an infrared photography system for sensing light of near-infrared wavelengths irradiated from the headlamp of a vehicle.

In FIG. 7, reference numeral 7A denotes the pattern of light irradiated from the lamp L1 of the example 1 provided in the lamp instrument 8 as the headlamp of a vehicle, reference symbol M denotes a pedestrian walking on a road R approx. 100 m away from the vehicle and irradiated by the headlamp 8 of the vehicle. Reference numeral 61 denotes a CCD camera designed to sense 400–1200 nm radiation, reference numeral 62 a monitor for displaying images picked up by the CCD camera 61, and reference numeral 63 an alarm for alarming that the pedestrian M is passing, using, for example, sound.

Further, reference numeral 8F denotes a filter that filters out visible light and passes near-infrared light. This filter may be opened and closed in synchrony with switching between the high beam and low beam.

Figure 8:
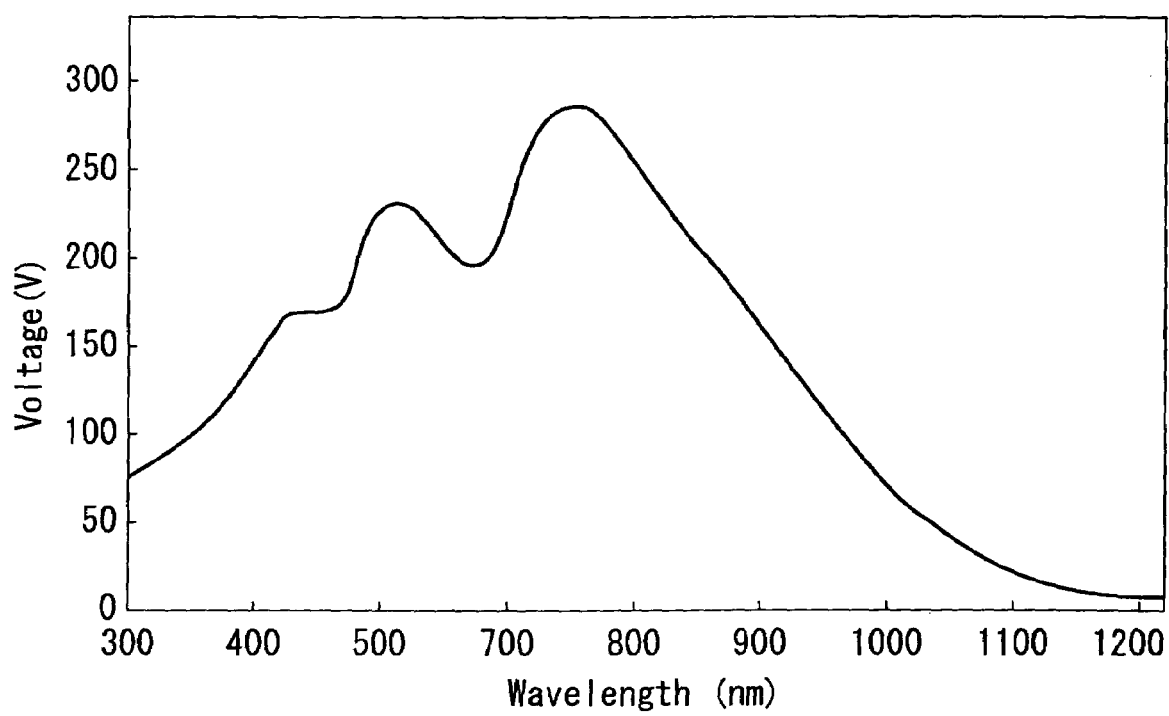
FIG. 8 is a graph illustrating the sensitivity characteristic of a CCD camera.
Figure 9:
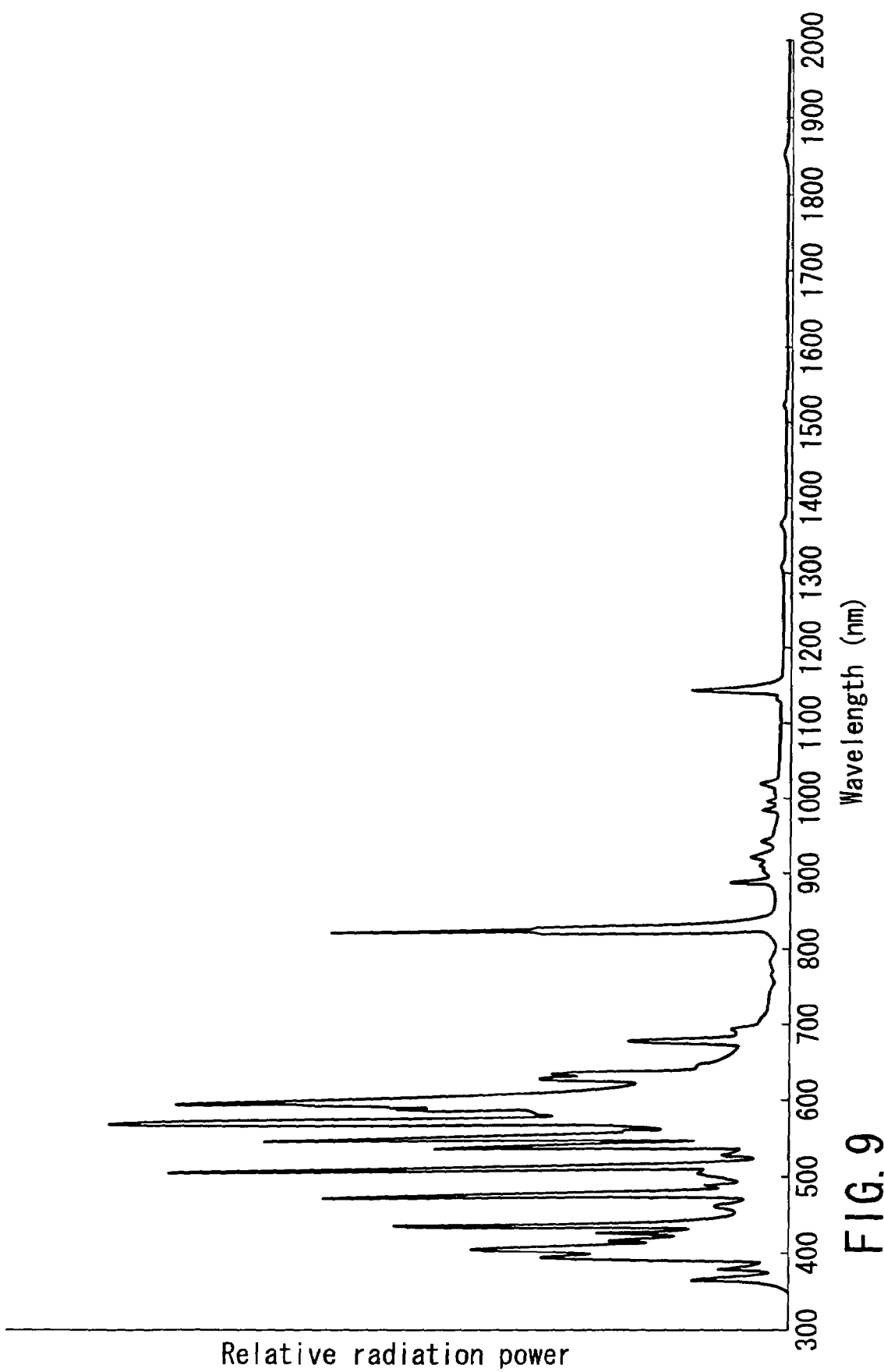
FIG. 9 is a graph illustrating the spectroscopic distribution (300–2000 nm) of a conventional light emission tube sealed with a gas (NaI+$ScI_3$+Hg).

The CCD camera 61 is a well-known one and exhibits the sensitivity characteristic shown in FIG. 8. In FIG. 8, the abscissa indicates the wavelength (nm) of light, and the ordinate indicates the voltage (V) corresponding to the sensitivity. The shown sensitivity corresponds to that of the lamp L1 of example 1 or 2 which is highly sensitive to near-infrared radiation.

For example, assume that during night cruising, a vehicle emits light from the discharge lamp L1 of the headlamp 8, which shows the same spectroscopic distribution characteristic as example 1, the object irradiated with the light being photographed by the CCD camera 61, displayed on the monitor 62 and monitored by the driver.

If there are no obstacles on the road R ahead, the road itself is displayed. However, if, for example, a pedestrian M is crossing the road R, near-infrared light is applied to the pedestrian M, and their image is caught by the CCD camera 61 and displayed on the monitor 62, thereby stimulating the driver to pay attention to the pedestrian and to, for example, reduce the speed in order to avoid an accident.

Drivers may be informed of an obstacle, pedestrian, etc. by the alarm generated by the alarm signal generator 63, as well as the image displayed on the monitor 62. Further, they may be displayed on the screen of a car navigator.

The wavelengths of near-infrared light irradiated by the discharge lamp L1 of the example 1 fall within a range in which the CCD camera 61 widely used exhibits a high sensitivity. Accordingly, when the discharge lamp L1 of the example 1 is used as the light source of the infrared photography system shown in FIG. 7, the recognition range of the infrared photography system is longer than in the case of using the conventional halogen bulb 1H.

Specifically, when the halogen bulb 1H was used, the recognition range was approx. 90 m. On the other hand, when the discharge lamps 1A–1D of the embodiment were used, the recognition range was approx. 180 m, i.e., a double. This enables drivers to quickly recognize the situation and avoid an accident.

Furthermore, the life of the halogen bulb 1H is approx. 800 hours, while that of the discharge lamps 1A-1D is 3000 hours or more even if they are frequently turned on and off, thereby significantly reducing the maintenance cost and effort.

As described above, the discharge lamps 1A–1D for irradiating near-infrared light are very suitable for the sensitivity characteristic of CCD cameras, and can be used as long-life, easy-maintenance light sources for, for example, infrared photography systems.

Also, the light generated by the above-described discharge lamp L1 of the example 2 has high intensities in both the visible region and near-infrared region. Therefore, the discharge lamp L1 of the example 2 can be used simultaneously as the headlamp of a vehicle that emits bright visible light, and as a light source for, for example, an infrared photography system. This is more advantageous in light of cost than a light source serving as either a headlamp or a light source for an infrared photography system.

The discharge lamps of the embodiment can be made compact, and exhibit a high resistance against vibration or impact since the electrodes do not incorporate a filament coil. Accordingly, they can provide a compact long-life projector that has a high efficiency and high resistance against vibrations, compared to the low-pressure gas discharge lamp disclosed in the above-mentioned publication, Jpn. Pat. Appln. KOKOKU Publication No. 4-70736.

Furthermore, if the discharge lamp L1 of the embodiment is used as an assistant lamp for a headlamp or as a light source dedicated to near-infrared radiation, a visible-region blocking filter may be provided which is obtained by mixing a material for reducing or blocking visible light, with the material of the airtight bulb 1 or light control member 83. Alternatively, the surface of the airtight bulb 1 or light control member 83 may be coated with a single film of a material for reducing or blocking visible light, or with a multi-interference film.

A filter for reducing or blocking visible light may be secured to the radiation side of the light control member 83.

Further, a movable filter may be provided so that it can be moved between a position in which the lamp can serve as a headlamp for irradiating visible light, and a position in which the lamp irradiates infrared light. For example, as indicated by the broken lines in FIG. 6, a plate-like filter 8F is provided between the light control member 83 and discharge lamp L1. In this case, the filter 8F is arranged vertically to obtain infrared radiation and horizontally to obtain visible radiation. The plate-like filter 8F may be also foldable so that it is opened and folded for blocking of light and passing of light, respectively.

If the lamp L1 of the embodiment is used as both a headlamp and light source for near-infrared radiation, or used as a headlamp for both long-range radiation and short-range radiation, the lamp may be movable between a visible-light-filtering position and standard position. In this case, the lamp can be easily moved by an electromagnetic valve or the negative pressure generated by the engine.

The present invention is not limited to the above-described embodiments. For example, although in the embodiment, the infrared photography system is employed in the headlamp of a vehicle, such as an automobile, it can also be used for security in banking facilities, airports, highways, etc.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A metal vapor discharge lamp comprising:
   a refractory and light-transmitting hermetic vessel;
   a pair of electrode fixed to said hermetic vessel;
   a discharge medium sealed in the hermetic vessel, the discharge medium containing a halide, a rare gas and substantially disusing mercury, the halide containing a halide of cesium (Cs) which radiates light of near-infrared wavelengths (750-1100 nm); and
   most of light irradiated from the metal vapor discharge lamp having near-infrared wavelengths (750–1100 nm).

2. The metal vapor discharge lamp according to claim 1, further comprising a visible-light blocking filter.

3. The metal vapor discharge lamp according to claim 1, wherein a wattage rating of the metal vapor discharge lamp is 100 W or less.

4. The metal vapor discharge lamp according to claim 1, wherein a distance between the pair of electrodes falls within a range of 1 mm to 6 mm.

5. A metal vapor discharge lamp comprising:
   a refractory and light-transmitting hermetic vessel;
   a pair of electrode fixed to said hermetic vessel;
   a discharge medium sealed in the hermetic vessel, the discharge medium containing a first halide and a rare gas, the first halide containing a halide of at least one of sodium (Na), scandium (Sc) and a rare earth metal which radiate visible light (380–780 nm), the discharge medium substantially disusing mercury;
   a ratio of visible-radiation power (380–780 nm) to near-infrared radiation power (750–1100 nm) falling within a range of 0.5:1 to 4.0:1, the visible-radiation power and the near-infrared radiation power being output when the metal vapor discharge lamp is in an ON state; and
   a visible-light blocking, filter.

6. The metal vapor discharge lamp according to claim 5, wherein the discharge medium includes:
   a second halide which generates a relatively high vapor pressure and being a halide of at least one metal which emits a visible light less than that emitted by the metal of the first halide; and
   a third halide containing a halide of at least one metal which radiates near-infrared light.

7. The metal vapor discharge lamp according to claim 5, wherein the discharge medium contains a halide of at least one of potassium (K), cesium (Cs) and rubidium (Rb) which radiate light of near-infrared wavelengths (750–1100 nm).

8. The metal vapor discharge lamp according to claim 5, wherein a wattage rating of the metal vapor discharge lamp is 100 W or less.

9. The metal vapor discharge lamp according to claim 5, wherein a distance between the pair of electrodes falls within a range of 1 mm to 6 mm.

10. The metal vapor discharge lamp according to claim 5, wherein the rare gas is Xe, Xe of five atoms or more being sealed in the hermetic vessel.

11. A projector comprising:

a reflector;

a metal vapor discharge lamp as specified in any one of claim 1 to 9, the metal vapor discharge lamp being provided on the reflector; and a light control member covering a front surface of the reflector.

12. The projector according to claim 10, wherein the projector is installed in a vehicle and used as a headlamp.

13. The projector according to claim 11, further comprising visible-light blocking means for blocking visible light and passing near-infrared light therethrough in a high beam mode, and means for removing the visible-light blocking means from a radiation direction of the metal vapor discharge lamp in a low beam mode.

14. The projector according to claim 10, further comprising a visible-light blocking filter provided on at least one of front and rear surfaces of the light control member.

15. The projector according to claim 13, wherein the projector is installed in a vehicle and used as a headlamp.

16. The projector according to claim 14, wherein the visible-light blocking filter blocks visible light and passes near-infrared light therethrough in a high beam mode, and further comprising means for removing the visible-light blocking filter from a radiation direction of the metal vapor discharge lamp in a low beam mode.

17. A metal vapor discharge lamp lighting device comprising:

a metal vapor discharge lamp as specified in any one of claims 1 to 9; and a lighting circuit which supplies a current three times or more a rated lamp current after the metal vapor discharge lamp is lit, and reduces the current with a lapse of time.

* * * * *